United States Patent [19]

Herzog et al.

[11] 4,312,256
[45] Jan. 26, 1982

[54] CUTTING TOOL ARRANGEMENT

[75] Inventors: Reinhold Herzog; Helmut Roth, both of Neuhausen; Günther Berger, Wolfschlugen, all of Fed. Rep. of Germany

[73] Assignee: Robert Bosch GmbH, Stuttgart, Fed. Rep. of Germany

[21] Appl. No.: 147,090

[22] Filed: May 7, 1980

[30] Foreign Application Priority Data

Jul. 24, 1979 [DE] Fed. Rep. of Germany ....... 2929882

[51] Int. Cl.³ .............................................. B23D 27/02
[52] U.S. Cl. ....................................... 83/694; 30/180; 30/241; 83/916
[58] Field of Search .................... 83/916, 693, 694; 30/180, 241, 242, 243

[56] References Cited

U.S. PATENT DOCUMENTS

| | | | |
|---|---|---|---|
| 2,035,448 | 3/1936 | Anderson | 83/916 X |
| 2,364,334 | 12/1944 | Wold | 83/916 X |
| 2,637,671 | 5/1953 | Pavitt | 30/350 X |
| 3,064,349 | 11/1962 | Futterer et al. | 30/350 X |
| 3,357,290 | 12/1967 | Neale | 83/651 |
| 3,903,772 | 9/1975 | Wickens | 83/916 X |
| 3,975,891 | 8/1976 | Gunther | 30/350 X |
| 4,158,913 | 6/1979 | Batson | 30/241 |

Primary Examiner—James M. Meister
Attorney, Agent, or Firm—Michael J. Striker

[57] ABSTRACT

A cutting tool arrangement for a nibbler, wherein a support shaft with a cutting head is arranged for reciprocating movement relatively to a die, has the support shaft including an elongated portion, a narrowing portion and an end portion. The cutting head formed as a sleeve-shaped element surrounds the end portion of the shaft and a lower part of the narrowing portion of the shaft and is soldered thereto to prevent fatigue concentration stresses in a transition zone between the narrowing portion of the shaft and the cutting head.

5 Claims, 2 Drawing Figures

CUTTING TOOL ARRANGEMENT

BACKGROUND OF THE INVENTION

The present invention relates generally to stamp-wise cutters utilized for nibblers which are used for cutting sheets or plates of metal by punching a succession of overlapping holes along the desired contour.

More particularly, the invention relates to a cutting tool arrangement wherein a cutting head is movable with respect to a die of a nibbler.

A cutting tool assembly known for example from the Great Britain Pat. No. 1,485,795 includes a die and a one-piece cutting tool with a support shaft having a narrowing portion or neck carrying a cutting head which is periodically inserted into the die to cut off the material fed into the cutting tool. A guide ring is provided in the assembly which is positioned in a coaxial alignment with the die and connected thereto. The cutting head is guided is a direction toward the die. It has been found that although the useful life of the cutting heads in the known cutting tool assemblies permits are to use sufficiently sharp cutting edges and the neck is not broken off the shaft, the cutting tools have to be produced from a high-quality steel and to be hardened and heat-treated in a relatively expensive manner. It can not be excluded that even with many steps of heat treatment provided for the cutting heads a desirable hardness and a greater toughness may not be obtained. The cutting head which was preliminary assembled to the shaft may be broken off the shaft's neck. In order to avoid such break one tried to reduce fatigue concentrations at a transition between the shaft neck and the cutting head by provision of a smoothing zone of a relatively great radius.

This measure is normally provided preliminary and is a limited measure since the assumed difference between the diameters of the cutting head and the shaft neck may cause a so-called negative cutting angle, or in order to avoid the negative cutting angle, a larger difference between the diameters may be selected. In the first instance an undesirable impact of the cutting head against the workpiece or against the machine tool itself or both may occur in operation. One may try to counteract this disadvantage by using a considerable energy consumption during the machine operation. For this purpose a rear hub of the cutting stamps is positioned below the workpiece so that the latter and the shaft neck are pressed one opposite to the other.

During the next stroke of the stamp, the rounding between the neck and the cutting stamp pushes the workpiece and the machine apart all the more strongly.

In the second instance the disadvantage resides in that the relatively large selected difference between the diameters of the neck and the cutting head results in a greater size of the openings punched by the cutting tool which require only powerful machines to be used.

SUMMARY OF THE INVENTION

Accordingly, it is an object of the invention to overcome the disadvantages of the prior art.

More particularly, it is an object of the invention to provide an improved mounting arrangement for a cutting head connected to a shaft adapted for a reciprocating movement with respect to a die in a cutting tool assembly for a nibbler.

Another object of the invention is to provide a relatively inexpensive reliable mounting arrangement for a cutting head wherein a break due to fatigue concentrations in a transition between the cutting head and the shaft neck is prevented.

These and other objects of the invention are attained by a cutting tool arrangement which comprises a cutting tool including a support shaft carrying a cuttting head and adapted for reciprocating movement with respect to a die. The support shaft includes an elongated portion, a narrowing portion and an end portion. The cutting head is rigidly affixed to the narrowing portion.

The cutting head may be formed as a sleeve which surrounds an end portion of the shaft and a lower part of the narrowing portion.

The cutting head may be soldered to the end and narrowing portions of the shaft.

The cutting head may be made from a sintered metal carbide such as a titanium carbide.

The mounting arrangement of the invention provides a locking connection between the cutting tool elements which permits one to prevent a galling between the adjacent surfaces of the assembled members.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE INVENTION

Figure 1:
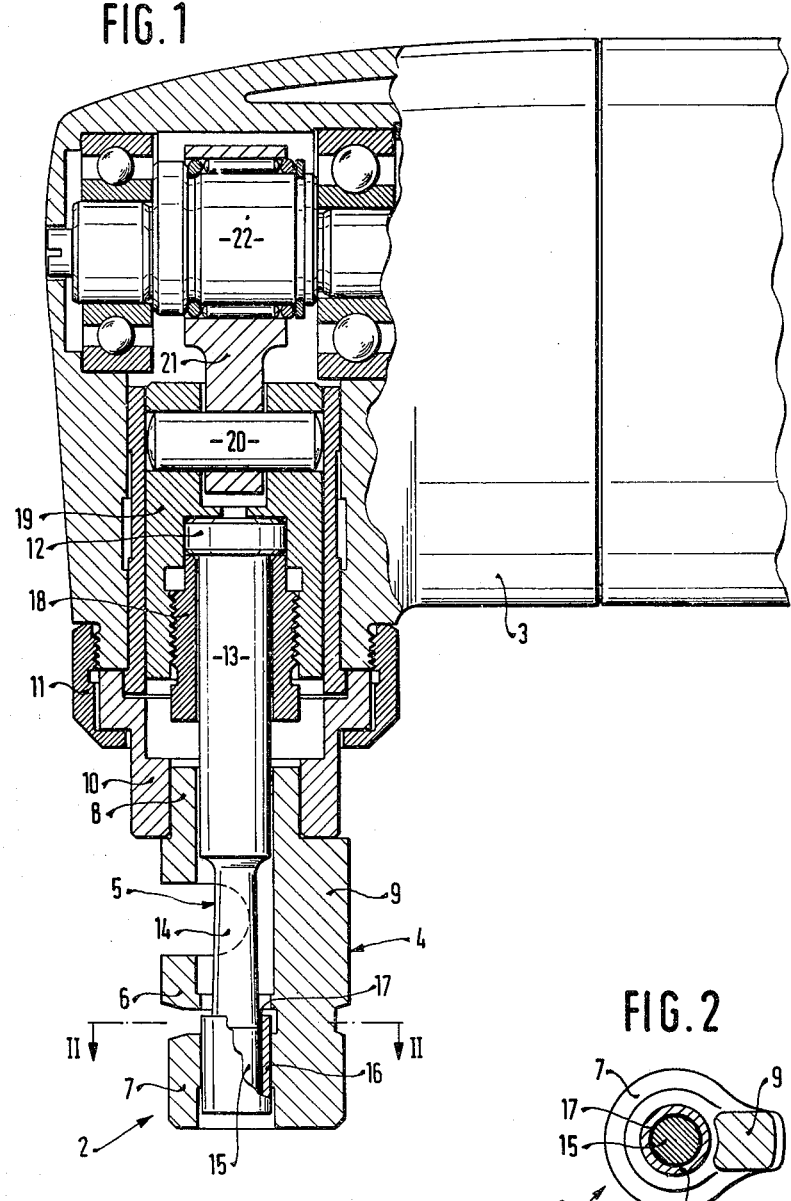
FIG. 1 is a partially sectioned elevational view of a cutting tool in accordance with the invention.
Figure 2:
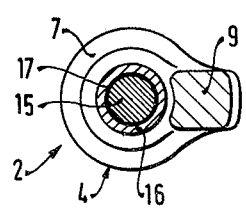
FIG. 2 is a cross-section taken along line II—II of FIG. 1.

Referring to the drawings, a tool assembly generally designated as 2 is rigidly connected to a nibbler 3 and includes an outer tool sleeve 4 and a cutting tool 5 arranged to move upwardly and downwardly within the outer sleeve 4.

The outer sleeve 4 is formed as a one-piece element comprising a die 6, a guiding ring 7 coaxially aligned with the die 6 and a support shoulder 8. The die 6 is arranged between the support shoulder 8 and the guiding ring 7. All three portions of the sleeve 6 form a hollow member having a support 9 to connect shoulder 8, die 6 and guiding ring 7 together. The support shoulder 8 is mounted within a flange 10 which in turn is arranged in an upwardly positioned nut 11 threadedly affixed to a housing of the nibbler 3.

The cutting tool 5 is provided with a collar 12 merging into an elongated shaft 13 having a thin portion or neck 14 and an end portion 15 carrying a sleeve-shaped cutting head 16. The end portion 15 is preferably cylindrical. The lower portion of the neck 14 is also cylindrical so that the cutting head mounted thereon engages both the end portion 15 of the support shaft 13 and the cylindrical part of the neck 14. The cutting head 16 is a cylindrical sleeve which is pushed onto the end portion 15 and the lower portion of the neck 14 and soldered thereto. The use of supplementary devices in order to hold the sleeve 15 on the end 15 and neck 14 during the soldering process is not necessary in this case. The solder 17 in a form of a wire is merely inserted between the elements to be soldered and then soldered to connect the sleeve 16 to the shaft end 15. The support shaft 13 with the collar 12, the neck 14 and the end portion 15 are a one-piece item made from an age-hardened steel. The sleeve-shaped cutting head 16 as well as the die 6 may be formed of a suitable cutting tool which is normally a material with a small coefficient of thermal expansion. Sintered metal carbides may be preferably used as a material for the cutting head 16 which are known as so-called "hard metals". Such extremely hard materials as carbides, as for example titanium carbide, are usually mixed with a binder such as steel. The cutting head 16 is therefore a wear-resistant member whereas the support shaft 13 and the neck 14 are exposed to long-time alternating strength stresses. The solder 17 holds in a rigid connection the cutting head 16 with the neck 14 and thereby reduces the possibility of fatigue cracks or failure caused-by stress concentrations in a transition zone between the neck 14 and the end portion 15.

The support shaft 13 mounted on a threaded bushing 18 by means of the collar 12 is affixed to a guide piston 19. The guide piston 19 is connected through pins 20 to a piston rod 21 which in turn is arranged on a crank shaft 22 associated with a rotatable shaft of the nibbler 3. The crank shaft 22 affects a reciprocating movement upwardly and downwardly of the support shaft 13 in a direction of elongation of the latter. The plate-shaped or sheet workpiece is fed into a space between the die 6 and the guiding ring 7. By periodical insertion of the cutting head 16 into the die 6 the workpiece is cut off by punching of overlapping holes along the line of insertion of the workpiece into the cutting tool.

A cemented or glued connection between the end shaft portion 15, neck 14 and the cutting head 16 may be used in place of the solder connection described herein.

It will be understood that each of the elements described above, or two or more together, may also find a useful application in other types of cutting tool arrangement differing from the types described above.

While the invention has been illustrated are described as embodied in a cutting tool arrangement, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without emitting features that, from the standpoint of prior art, fairly constitute essential characteristics of the generic or specific aspects of this invention.

What is claimed as new and desired to be protected by Letters Patent is set forth in the appended claims:

1. A cutting tool arrangement for a nibbler having two movable one relative to the other tool elements, comprising a cutting tool including a support shaft carrying a cutting head, and a die, said support shaft being adapted for reciprocating movement with respect to said die and including an elongated portion, a narrowing intermediate portion, and an end portion, said cutting head engaging said end portion and a part of said narrowing portion adjacent said end portion and being soldered to said narrowing portion and said cutting head to thereby prevent fatigue concentration stresses at a transition zone between said cutting head and said narrowing portion.

2. The arrangement of claim 1, wherein said cutting head is a sleeve-shaped element surrounding said end portion of said shaft and said part of said narrowing portion.

3. The arrangement of claim 2, wherein said cutting head and said die are made from a material with low coefficient of thermal expansion.

4. The arrangement of claim 3, wherein said cutting head is made of a sintered metal carbide.

5. The arrangement of claim 3, wherein said metal carbide is a titanium carbide.

* * * * *